Aug. 9, 1960   L. H. GARDNER   2,948,298
VALVE
Filed Nov. 21, 1958   2 Sheets-Sheet 1
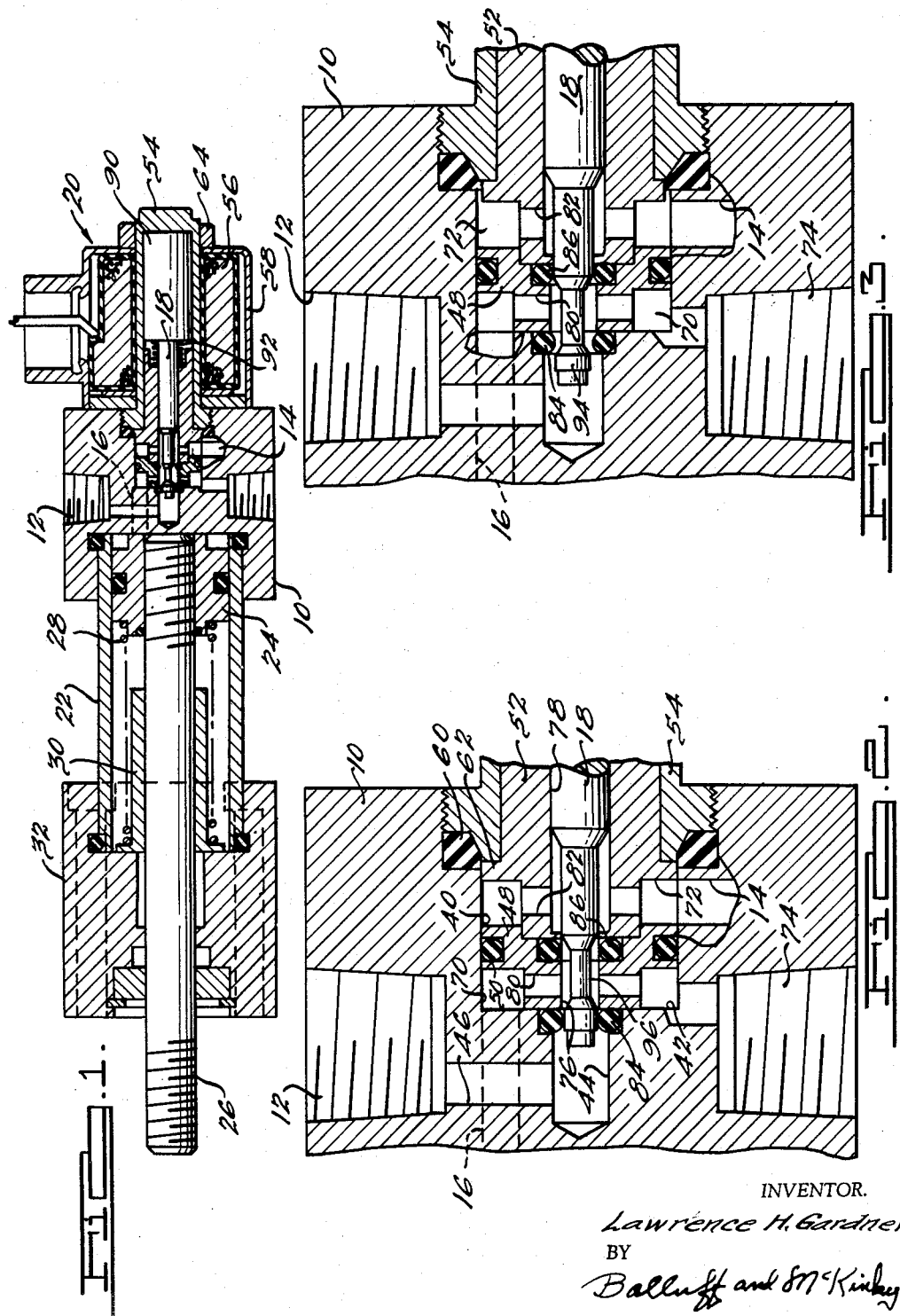
INVENTOR.
Lawrence H. Gardner
BY
Balluff and McKinley
ATTORNEYS.

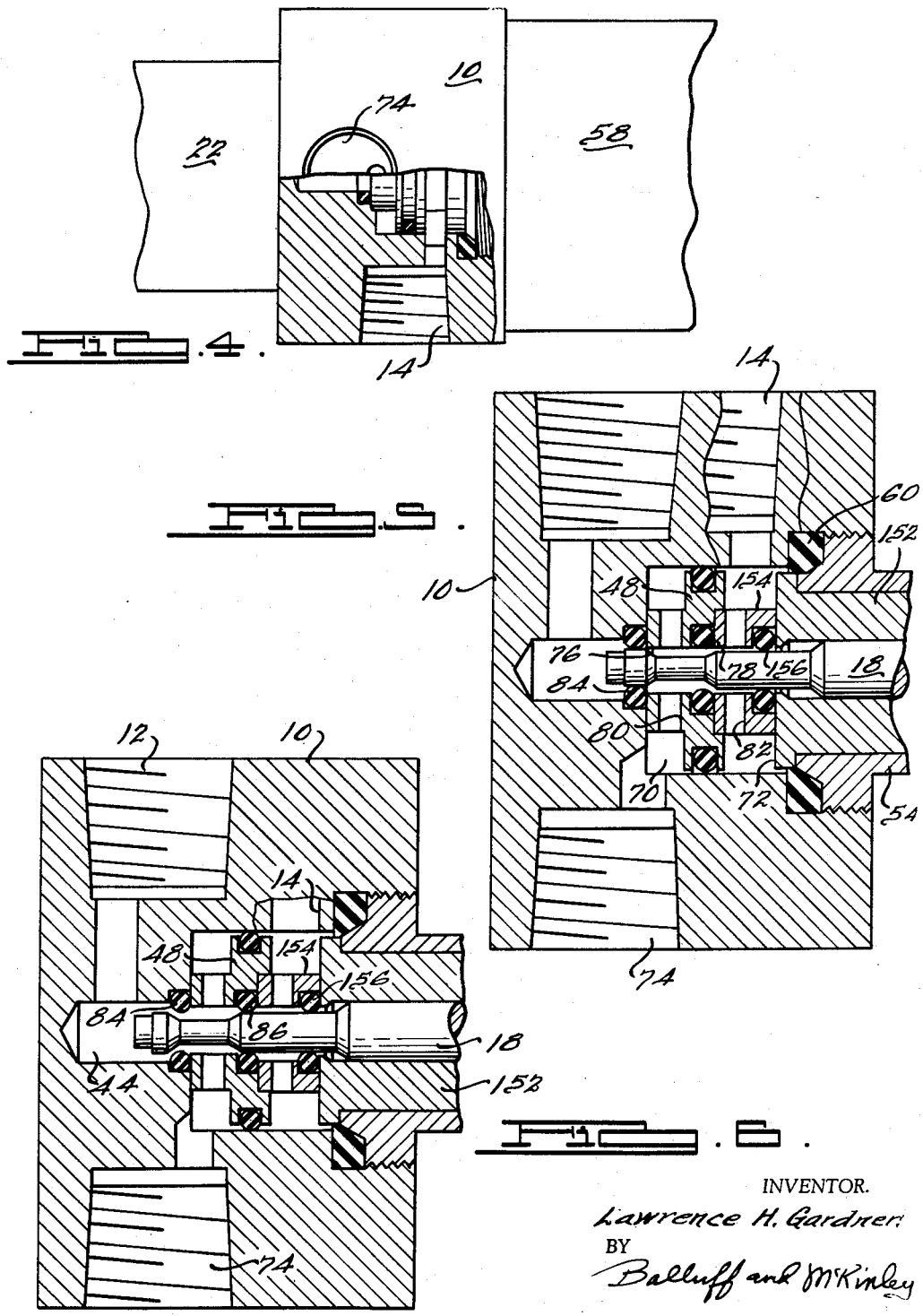

United States Patent Office 2,948,298
Patented Aug. 9, 1960

2,948,298
VALVE
Lawrence H. Gardner, North Olmstead, Ohio
(7313 Associate Ave., Cleveland 9, Ohio)
Filed Nov. 21, 1958, Ser. No. 775,587
5 Claims. (Cl. 137—620)

This invention relates to a valve for controlling the supply and exhaust of air or other pressure fluid to and from a work cylinder. The invention is particularly directed to providing a valve of this type which is simple in construction and easily adapted to a great variety of uses and which may be of either the normally open or the normally closed type.

A principal object of the invention is to provide a new and improved valve for controlling the supply and exhaust of pressure fluid to and from a work cylinder.

Another object of the invention is to provide a valve structure of the type described which is readily adapted to a great variety of uses and to different installations.

A further object of the invention is to provide a valve structure which is simple in construction and economical to manufacture and which may be made as either a normally open or a normally closed valve by the simple substitution of certain interchangeable parts.

Other and further objects of the invention will be apparent from the following description and claims and may be understood by reference to the accompanying drawings, of which there are two sheets, which by way of illustration show preferred embodiments of the invention and what I now consider to be the best mode in which I have contemplated applying the principles of my invention. Other embodiments of the invention may be used without departing from the scope of the present invention as set forth in the appended claims.

In the drawings:

Fig. 1 is a sectional view through a normally closed valve constructed in accordance with the present invention and showing the same attached to a work cylinder which is controlled thereby;

Fig. 2 is an enlarged fragmentary sectional view of the valve structure shown in Fig. 1;

Fig. 3 is a view similar to Fig. 2 showing the valve in a different position thereof;

Fig. 4 is an elevational view partly in section of the valve;

Fig. 5 is a sectional view of a normally open valve constructed in accordance with the present invention; and Fig. 6 is a sectional view similar to Fig. 5 showing the valve in its closed position.

Referring to Figs. 1 to 4, there is disclosed a normally closed valve having a valve body 10 provided with an air inlet port 12, an exhaust port 14, and a work port 16 controlled by a valve stem 18 actuated between its opened and closed positions by a solenoid 20. A work cylinder 22 is connected directly to the valve body 10 and includes a piston 24 movable within the cylinder 22 and carrying a piston rod 26 which may be connected to any device to be actuated by the valve. The piston 24 is urged toward one end of the cylinder 22 by a spring 28 which reacts at its other end against a sleeve 30 within which the piston rod 26 is slidably disposed. The sleeve 30 and the end of the cylinder 22 are suitably supported on a block or bracket 32. The valve is shown in Figs. 1 and 2 in its normally closed position in which the piston 24 and piston rod 26 are at the right-hand end of the cylinder 22. Upon actuation of the valve by the solenoid 20 air under pressure will be supplied through the work port 16 into the right-hand end of the cylinder 22 to force the piston 24 to the left to effect a working stroke. When the valve is again closed, the air within the right-hand end of the cylinder will be exhausted back through the work port 16 and through the exhaust port 14 in a manner to be described.

Referring to Figs. 2 and 3, the valve body 10 is provided with a cylindrical valve chamber 40 having an end wall 42 and a bore 44 extending from the end wall 42. The inlet port 12 comprises a threaded opening adapted to receive the threaded end of an inlet line (not shown) and communicates with the bore 44 through an inlet passage 46. An annular valve seat element 48 has an inner end of smaller diameter than the diameter of the valve chamber 40 seated against the end wall 42 and an annular flange portion carrying a seal in the form of an O-ring 50 sealingly engaging the wall of the chamber 40.

A valve guide element 52 has its inner end seated against the valve seat member 48 and extends therefrom into a hollow closure member 54 which is surrounded by the solenoid coil 56. The coil 56 is disposed within a casing 58 suitably secured to the valve body 10.

The closure member 54 has a threaded engagement with the valve body 10 and engages a seal 60 disposed within a groove at the outer end of the valve chamber 40. The end of the member 54 engages an annular flange 62 on the guide element 52 to hold the latter against the valve seat element 48. The solenoid 20 may be secured against the valve body 10 by a nut 64 threaded onto the outer end of the closure member 54.

An annular passage 70 is provided between the end wall 42 of the valve chamber and the valve seat element 48, while a second annular passage 72 is formed between the valve seat element 48 and the flange 62 on the guide element 52. The passage 70 communicates with the work port 16 leading to the work cylinder 22, while the second annular passage 72 communicates with the exhaust port 14. For purposes of clarity, the exhaust port 14 is shown in Figs. 1, 2 and 3 displaced 90° from the position that it actually occupies. The true position of the exhaust port 14 is shown in Fig. 4, which is a view taen at 90° to Figs. 1, 2 and 3. It is also to be noted that Figs. 1 to 4 disclose an additional work port 74 communicating with the passage 70. It is contemplated that when the work port 16 is used in an installation of the type shown in Fig. 1 the port 74 would be suitably closed by a plug and would be inoperative. Similarly when other installations require that the port 74 be employed as the work port, then the port 16 would be closed by a suitable plug. The operation of the valve is the same whether the port 16 or the port 74 is used as the work port.

The valve seat element 48 and the guide element 52 have axial passages 76 and 78, respectively, which are aligned with the bore 44 in the valve body 10. The valve seat member 48 is provided with one or more radial passages 80 leading from the axial passage 76 to the annular passage 70. The guide element 52 has radial passages 82 leading from its axial passage 78 to the second annular passage 72. A seal in the form of an O-ring 84 defines a valve seat between the inlet port 12 and the work port 16, while the O-ring 86 defines a valve seat between the work port 16 and the exhaust port 14.

The valve stem 18 has an enlarged outer end 90 slidably disposed within the member 54. A spring 92, reacting between the valve guide 52 and the enlarged end 90, urges the valve stem 18 to its closed position illustrated in Figs. 1 and 2. The inner end 94 of the valve 18 sealingly engages the O-ring 84 in the closed position of the valve and closes the communication between the inlet and work ports of the valve. The valve stem 18 has a portion 96 of reduced diameter having a length slightly greater than the axial distance between the O-rings 84 and 86 so that, when the end 94 of the valve stem engages the O-ring 84, the reduced portion 96 of the valve stem will establish communication between the work port 16 and the exhaust port 14 through the radial passages 80, the axial passages 76 and 78, and the radial passages 82.

When the solenoid 20 is energized, the valve stem 18 will be shifted inwardly against the spring 92 to the position shown in Fig. 3 in which the end 94 of the valve stem disengages the O-ring 84, while the O-ring 86 is engaged by the valve stem to close the communication between the work port 16 and the exhaust port 14. In this position of the valve the inlet port 12 communicates with the work port 16 through the passage 46, bore 44, and passages 76, 80 and 70. Actuation of the solenoid 20 thus effects the working stroke of the piston 24 and subsequent de-energization of the solenoid will allow spring 92 to return the valve to its normally closed position.

Figs. 5 and 6 disclose a normally open valve which is very similar in construction to the normally closed valve previously described. All of the parts of the valve shown in Figs. 5 and 6 are the same as those disclosed in Figs. 1 to 4 with the exception of the valve guide member 52 of the normally closed valve, which is replaced in the normally open valve by a valve guide 152 and an annular ring 154, which parts together perform the functions of the valve guide 52 of the normally closed valve described above. In addition, an O-ring 156 is employed in the modied type of valve shown in Figs. 5 and 6.

In the normally open valve of Figs. 5 and 6, the port 14 constitutes the air inlet port, the port 12 constitutes the exhaust port, and the port 74 is the work port. As in the previous modification the port 14 is shown in the drawing displaced 90° from the position that it actually occupies. When the solenoid is de-energized, the valve stem 18 occupies the position shown in Fig. 5 so that air under pressure is admitted through port 14 into the annular passage 72 and through passages 82, 78, 76, 80 and 70 into the work port 74 to which the work cylinder is connected. The exhaust port 12 is at such time closed by the engagement of the valve stem with the O-ring 84. When the solenoid is energized, the valve stem 18 is moved to the position shown in Fig. 6 to engage the O-ring 86, thereby closing the communication between the inlet port 14 and the work port 74 while establishing communication between the work port 74 and the exhaust port 12. The additional O-ring 156 prevents the application of inlet pressure along the valve stem 18.

It will be seen that the valve structure disclosed herein may be used as either a normally closed or a normally open valve merely by substituting the parts 152 and 154 for the part 52, and reversing the connections of the inlet and exhaust lines. While the valve has been disclosed as a solenoid operated valve, it will be apparent that any other suitable means either manually or automatically controlled might be employed for actuating the valve between its open and closed positions.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A valve for controlling the supply and exhaust of air to and from a work cylinder, comprising a valve body having a cylindrical valve chamber opening from one end thereof, an annular valve seat member having an inner end of smaller diameter than the diameter of said valve chamber seated against the end wall of said chamber, said valve seat member having an annular flange at its other end sealingly engaging the cylindrical wall of said chamber to define an annular passage between said flange and the chamber end wall, a valve guide element having an annular shoulder spaced from said valve seat member to define a second annular passage between said valve seat member and said valve guide element, said valve seat member having an axial passage therein, said valve body having a bore opening from said end wall and aligned with the axial passage in said valve seat member, a valve stem extending through said axial passage, a radial passage in said valve seat member between the axial passage therein and said first annular passage, means defining a passage connecting said axial passage and said second annular passage, seal means providing a valve seat between said bore and the axial passage in said valve seat member, seal means providing a second valve seat between said axial passage and said second annular passage, said valve stem in one position thereof being engageable with said first valve seat to close communication between said bore and said first annular passage while establishing communication between the latter and said second annular passage, said valve stem in a second position thereof being engageable with said second valve seat to close communication between said annular passages while establishing communication between said first annular passage and said bore, said valve body having an air inlet port, an exhaust port and a work port therein, said work port being connected to said first annular passage and said inlet and exhaust ports being connected one to said bore and the other to said second annular passage, and means for moving said valve stem from one of said positions to the other.

2. A valve according to claim 1 wherein said guide element is provided with an inner end of smaller diameter than the diameter of said valve chamber seated against said valve seat member, said inner end of said guide element having a radial passage therein connecting said second annular passage and the axial passage in said valve seat member.

3. A valve according to claim 1 including a seal engaging said valve stem on the side of said passage defining means remote from said axial passage in said valve seat member.

4. A valve according to claim 1 wherein said inlet port is connected to said bore and said exhaust port is connected to said second annular passage.

5. A valve according to claim 1 wherein said inlet port is connected to said second annular passage and said exhaust port is connected to said bore.

References Cited in the file of this patent

UNITED STATES PATENTS

| | | |
|---|---|---|
| 2,385,733 | Schroer | Sept. 25, 1945 |
| 2,632,341 | Arp | Mar. 24, 1953 |
| 2,711,757 | Gardner | June 28, 1955 |
| 2,761,470 | Batts | Sept. 4, 1956 |